June 19, 1956

J. F. JOY 2,751,206

CUTTING DEVICE ARRANGEMENT FOR GUIDED RECIPROCATION
PARALLEL TO A FACE CONVEYOR

Filed March 24, 1951

Inventor:
Joseph F. Joy.
By Charles F. Osgood
Attorney.

June 19, 1956  
J. F. JOY  
2,751,206  
CUTTING DEVICE ARRANGEMENT FOR GUIDED RECIPROCATION PARALLEL TO A FACE CONVEYOR  
Filed March 24, 1951  
11 Sheets-Sheet 5

Inventor:  
Joseph F. Joy.  
By Charles F. Osgood,  
Attorney.

June 19, 1956  J. F. JOY  2,751,206
CUTTING DEVICE ARRANGEMENT FOR GUIDED RECIPROCATION
PARALLEL TO A FACE CONVEYOR
Filed March 24, 1951  11 Sheets-Sheet 6

Inventor:
Joseph F. Joy.
by Charles F. Osgood,
attorney.

Inventor:
Joseph F. Joy.
Charles F. Osgood,
Attorney.

June 19, 1956

J. F. JOY

2,751,206

CUTTING DEVICE ARRANGEMENT FOR GUIDED RECIPROCATION
PARALLEL TO A FACE CONVEYOR

Filed March 24, 1951

Inventor:
Joseph F. Joy.
by Charles F. Osgood,
Attorney.

2,751,206
Patented June 19, 1956

2,751,206
CUTTING DEVICE ARRANGEMENT FOR GUIDED RECIPROCATION PARALLEL TO A FACE CONVEYOR

Joseph F. Joy, Pittsburgh, Pa., assignor to Joy Manufacturing Company, Pittsburgh, Pa., a corporation of Pennsylvania Application March 24, 1951, Serial No. 217,331

36 Claims. (Cl. 262—9)

This invention relates to coal mining apparatus and more particularly to a coal cutting and dislodging device especially designed for use in mines having low headroom and having cable operated feeding means and operating in conjunction with walking roof jacks and a face conveyor for mining coal from pillars intermediate parallel roadways and for loading the dislodged coal onto the face conveyor.

In known types of coal mining apparatus for operating along longwall faces or the faces of pillars extending between parallel roadways, and usually when low headroom is encountered, coal mining and dislodging devices, which sometimes assume the form of reciprocatory plows, are moved back and forth as by means of cables, along rectilinear paths across the coal face to dislodge the coal from the solid coal seam. While such plows serve to tear away or split the coal from the solid, the cuts are usually relatively shallow and considerable power is expended in moving the plow back and forth through the solid coal. In a known form of plow device suitable percussive tools are embodied therein in order to facilitate penetration and dislodgement of the solid coal, and in other forms of devices various cutter bar arrangements have been employed, but such devices are, in the main, not entirely satisfactory for the efficient and rapid production of coal as required in meeting the conditions of modern mining. The present invention contemplates improvements over such known devices in that a cable operated, pillar type mining apparatus is provided which substantially overcomes the disadvantages above outlined, in that relatively high production of coal and efficient and rapid operation are attained. The apparatus of the present invention comprises a reciprocatory coal cutting and dislodging device which embodies superimposed cutters which cut parallel superimposed slots or kerfs in the solid coal to form parallel projections or cores of coal as the device traverses the coal face and having associated therewith dislodging or splitting tools whereby the projections or cores of coal are torn or dislodged in relatively large fragments from the solid coal seam. The dislodged coal as it is removed from the coal face is deflected laterally onto a face conveyor, and as mining progresses, the entire apparatus is advanced, between the working strokes of the cutting and dislodging device, toward the face. The reciprocatory cutting and dislodging device of the present invention and the associated deflecting means are moved rapidly back and forth bodily along rectilinear paths across the coal face by means of a cable feeding mechanism of a novel design. The apparatus of the present invention is relatively compact and rugged in design, as well as relatively efficient and highly productive, well adapted for its intended purpose in the mining of pillars or the like from the solid in coal seams of low height.

An object of the present invention is to provide an improved coal mining apparatus having novel features of construction and design. Another object is to provide an improved coal mining apparatus for cutting the coal from a solid coal seam, for dislodging the cut coal and for directing the dislodged coal onto a face conveyor, all in an improved and more efficient manner. Still another object is to provide an improved mining apparatus especially designed for low height pillar work in underground coal mines, and embodying an improved reciprocatory cutting and dislodging device which rapidly traverses the face of a pillar for cutting and dislodging the solid coal. A further object is to provide an improved flexible feeding mechanism for a coal mining apparatus whereby the cutting and dislodging device may be moved bodily rapidly back and forth across the coal face. A still further object is to provide an improved mining apparatus having a plurality of superimposed kerf cutters or cutter bars for cutting parallel superimposed slots or kerfs in the solid coal to form parallel projections or cores of coal and having novel splitting tools associated therewith whereby the projections or cores of coal are effectually dislodged in relatively large fragments from the solid coal seam. Yet another object is to provide an improved mining apparatus associated with an improved face conveyor and having a novel relationship and connection with the conveyor. These and other objects and advantages of the invention will, however, hereinafter more fully appear.

In the accompanying drawings there is shown for purposes of illustration one form which the invention may assume in practice.

In these drawings:

Figs. 2 and 2a, taken together, constitute a side elevational view of the cutting and dislodging device shown in Figs. 1 and 1a.

The coal mining apparatus of the present invention generally comprises a reciprocatory cutting and dislodging device 1 having flexible feeding means 2, a face conveyor 3, and a series of self-moving or walking jacks 4 which serve not only to support and control the roof but also to advance the cutting and dislodging device and the conveyor toward the coal face as mining progresses. The reciprocatory cutting and dislodging device 1 is, in part, supported and guided by a longitudinally extending guide frame in the form of a guide rail 5 carried by the face conveyor and the latter is connected to every other one of the walking jacks by pivoted links 6. The walking jacks per se may assume any suitable form and for illustrative purposes may be similar to those disclosed in my copending application, Serial No. 24,574, filed May 1, 1948, now matured into Patent No. 2,714,505, dated August 2, 1955. While the mining apparatus disclosed is especially designed for use in pillar work in mines having low headroom, it is evident that it may be used in accordance with other systems of mining, and may be associated with other types of conveyors and roof supports.

Figure 3:
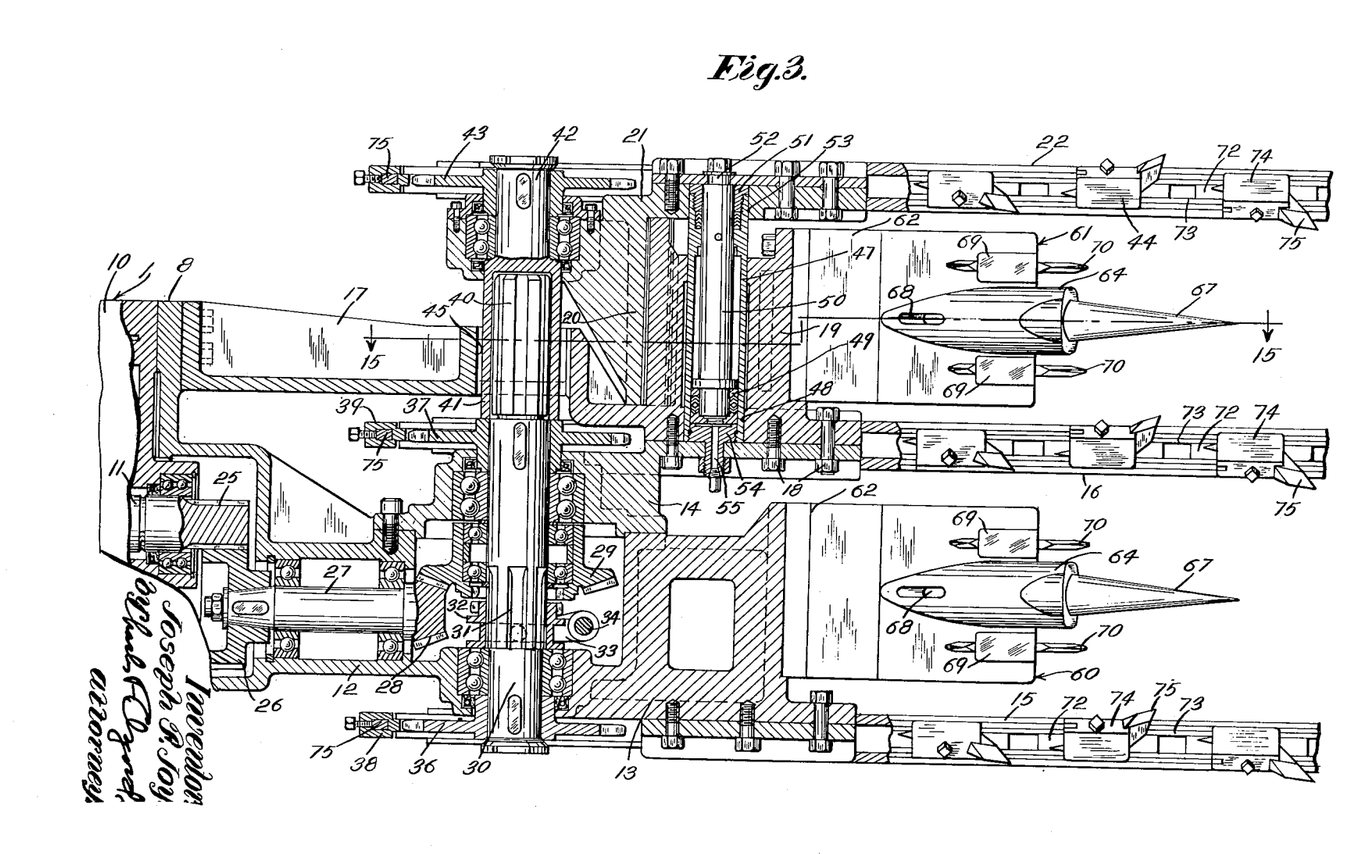
Fig. 3 is an enlarged longitudinal vertical sectional view taken on line 3—3 of Fig. 1, illustrating the superimposed cutter bars and associated splitting tools.

The reciprocatory cutting and dislodging device 1 is arranged in the relatively restricted space between the coal face and the face conveyor and, as shown in the drawings, comprises a relatively narrow, elongated machine frame or body 8 having a narrow bottom plate or shoe 9 resting upon and sliding over the floor of a mine, and carried by the machine frame is a motor 10, herein desirably an electric motor, having its power shaft 11 horizontally disposed and extending longitudinally of the frame. The machine frame has projecting forwardly from the motor casing a horizontal frame portion 12 which, in turn, supports a lower rigid hanger frame 13 and an upper rigid hanger frame 14 for a pair of parallel, horizontal, superimposed cutter bars 15 and 16 respectively. These bars extend longitudinally, endwise, in parallelism with the longitudinal axis of the frame 8 and with the guide rail 5. The upper hanger frame is rigidly braced by an upper horizontal bracket 17 secured to the upper portion of the motor casing, as shown in Fig. 3. Arranged above the upper hanger frame 14 and secured, as by screws 18, to the latter is an upstanding guide frame 19 suitably secured to the bracket 17 and having guides 19' slidingly engaged by upright guides 20 (see also Fig. 15) integral with a top adjustable hanger frame 21 for a top cutter bar 22 herein arranged in superimposed parallelism with the two lower cutter bars 15 and 16. The top hanger frame 21 is adjustable vertically relative to the upper guide frame 19 so that the elevation of the top cutter bar may be varied thereby to vary the distance apart of the two upper cutter bars 16 and 22 so as to accommodate the device to coal seams of varying height, as later explained.

Secured to the front end of the motor shaft 11 is a spur pinion 25 meshing with a spur gear 26 keyed to a longitudinally extending horizontal shaft 27 arranged in parallelism with the motor shaft. The shaft 27 is suitably journaled within bearings supported within the horizontal frame portion 12 of the machine frame, and secured to its front end is a bevel pinion 28 meshing with and driving a bevel gear 29 having its hub journaled on bearings supported by a vertical shaft 30, the latter in turn suitably journaled in bearings supported by the frame portion 12. Splined at 31 to the shaft 30 is a shiftable clutch member 32 having clutch teeth engageable with clutch teeth on the hub of the bevel gear 29 for connecting the latter to the shaft for driving the latter. This clutch member may be shifted by a pivoted shifter yoke 33 secured to a transverse operating shaft 34 mounted within the frame portion 12 and having a conveniently located operating handle 35 at the inner side of the lower hanger frame (see Fig. 4). Keyed to the shaft 30 are chain sprockets 36 and 37 which engage and drive endless cutter chains 38 and 39 respectively, guided for orbital circulation about the margins of the horizontal cutter bars 15 and 16 respectively. The upper portion of the shaft 30 is splined at 40 within a tubular portion 41 of a coaxial shaft 42, and the latter is suitably journaled in bearings supported by the top hanger frame 21 and has keyed to its upper end a chain sprocket 43 which engages and drives a cutter chain 44, similar to the cutter chains 38 and 39 and similarly guided for orbital circulation about the margin of the top cutter bar 22. The top bracket 17 is formed with an opening 45 through which the coaxial shafts 30 and 42 freely extend, in the manner shown in Fig. 3.

The adjusting means for the top cutter bar 22 comprises an extensible jack device including a vertical cylinder 47 secured in an upright bore 48 in the guide frame 19 and containing a reciprocable piston 49 having its piston rod 50 extending upwardly through the top cylinder head 51 and secured at 52 to the top hanger frame 21 for the top cutter bar. The top hanger frame has a bore 53 which receives the upper portion of the cylinder 47 when the top cutter bar is in its lowered position as shown. The cylinder 47 has a lower head 54 formed with a fluid conducting passage 55 with which a liquid supply conduit communicates, as hereinafter described, and when liquid under pressure is supplied to the lower end of the cylinder bore, the piston 49 may be moved upwardly to elevate the top cutter bar with respect to cutter bar 16. When liquid is trapped in the cylinder the top cutter bar may be locked in adjusted position.

Figure 1:
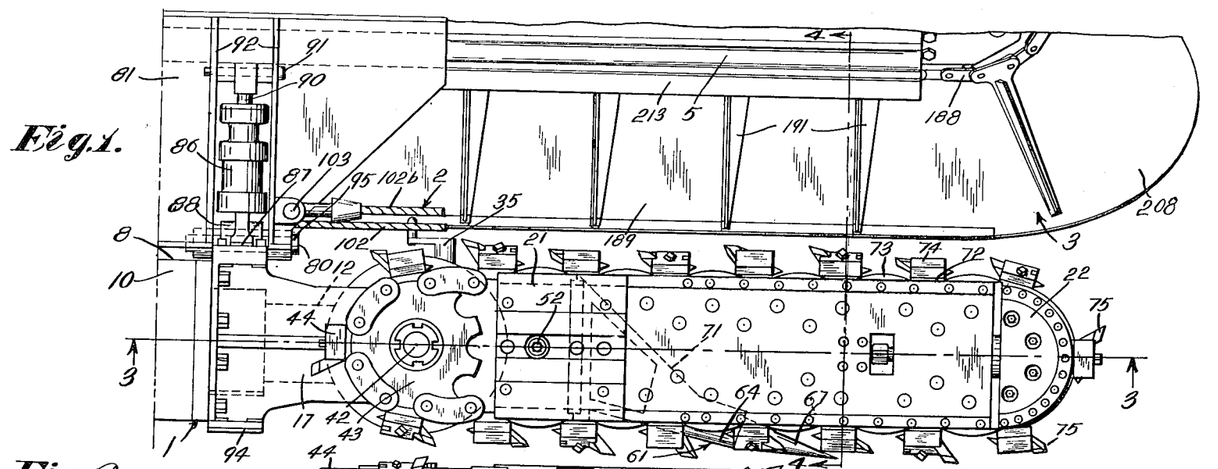
Figs. 1 and 1a, taken together, constitute a plan view of a reciprocatory cutting and dislodging device constructed in accordance with a preferred illustrative embodiment of the invention.
Figure 15:
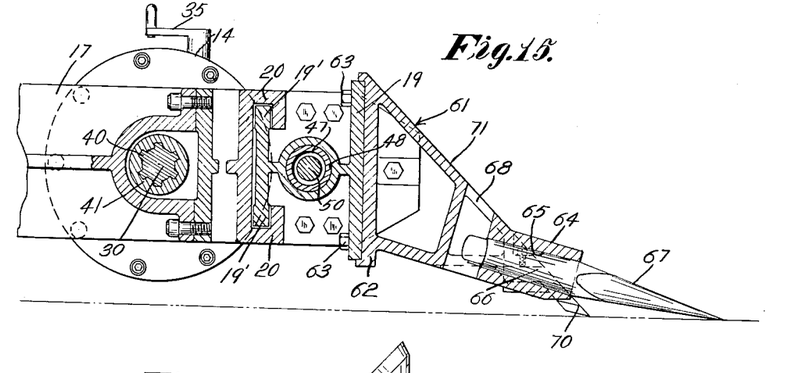
Fig. 15 is a horizontal section, on a somewhat different scale, taken on line 15—15 of Fig. 3, and illustrating one of the coal splitting tools and the associated deflector.

Arranged intermediate the horizontal cutter bars 15, 16 and 22 are coal splitting tools generally designated 60 and 61, respectively; the lower tool being carried by the lower hanger frame 13 and the upper tool being carried by the guide frame 19. These splitting tools are similar in design and each comprises, as shown in Fig. 15, a frame 62 secured as by screws 63, to its supporting frame. The frame 62 extends forwardly in the space between an adjacent pair of cutter bars and has a forward socketed portion 64 having a tapered socket 65 for receiving the tapered shank 66 of a pointed splitting instrument 67, the latter having its pointed end lying close to the path of the cutter bits at the inner runs of the cutter chains, as shown in Fig. 1. Each frame 62 is generally of triangular shape in horizontal cross section and has a transverse slot or opening 68 for receiving a suitable wedging tool for driving the shank of the instrument 67 out of its socket. Arranged at opposite sides of the socketed portion 64 of the frame 62, above and below the splitting instrument, are lateral lugs 69 having sockets for receiving cutter bits 70. Thus, as the superimposed cutter bars 15, 16 and 22 are advanced endwise along the coal face to cut parallel kerfs in the solid coal, the pointed splitting instruments 67 and the bits 70 engage the projections or cores of coal between the kerfs to tear away or dislodge the coal from the solid. Each triangular frame 62 provides an inclined deflecting or directing surface 71 which extends rearwardly and outwardly so that the dislodged coal, as the cutting and dislodging device is advanced rectilinearly along the face, is deflected laterally onto the face conveyor.

The endless cutter chains of the three parallel cutter bars 15, 16 and 22 may assume various forms but herein, for illustrative purposes, each comprise a series of chain blocks 72 pivotally connected by strap links 73, and the blocks have lateral lugs 74 formed with sockets for receiving cutter bits 75. The cutter bits 75, and those of the splitting tools, are of the double ended reversible type.

Figure 1A:
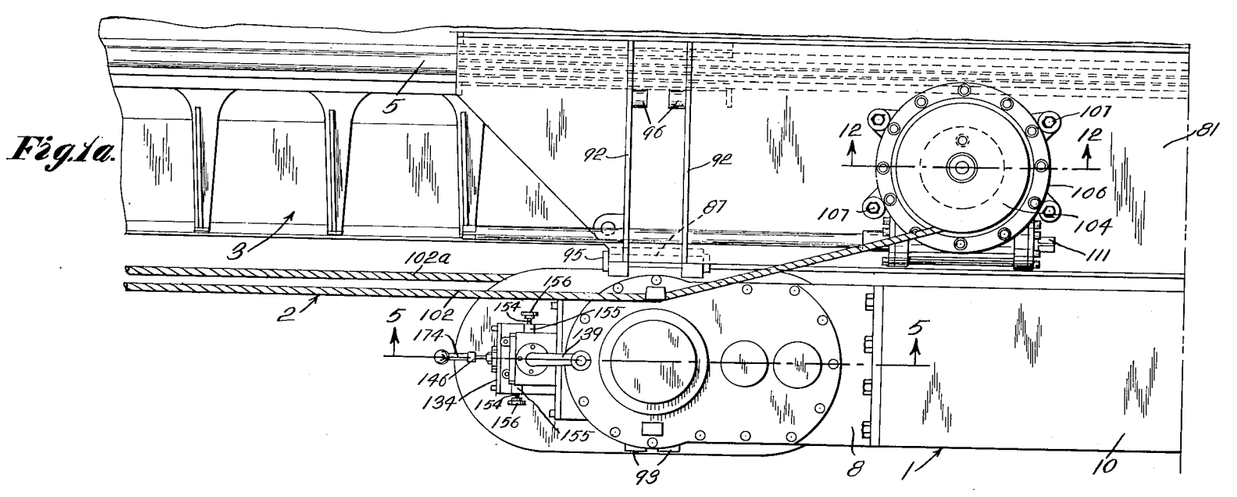
Figure 2:
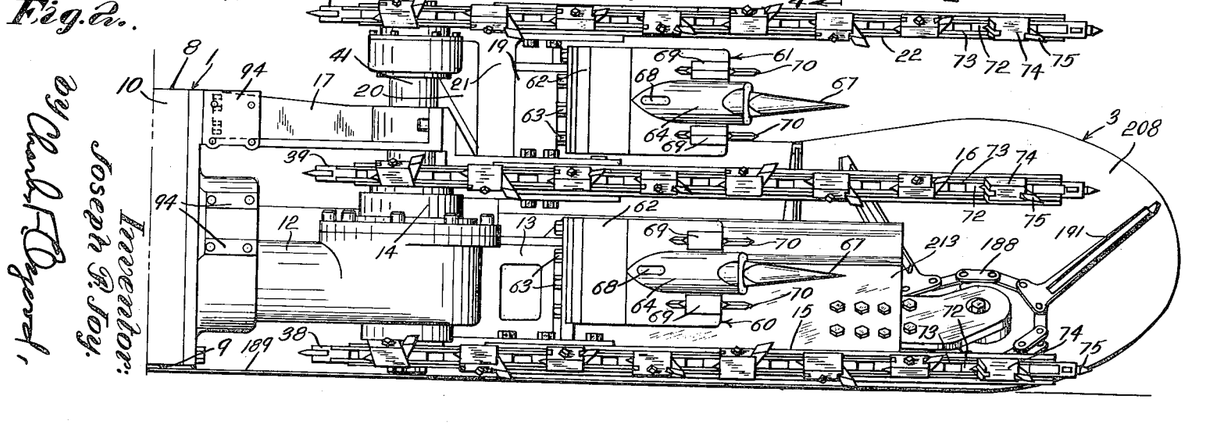
Figure 2A:
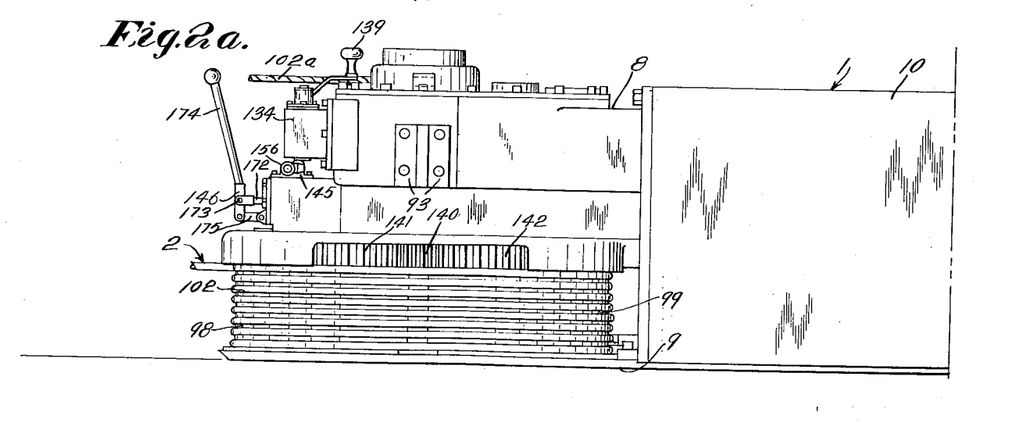
Figure 4:
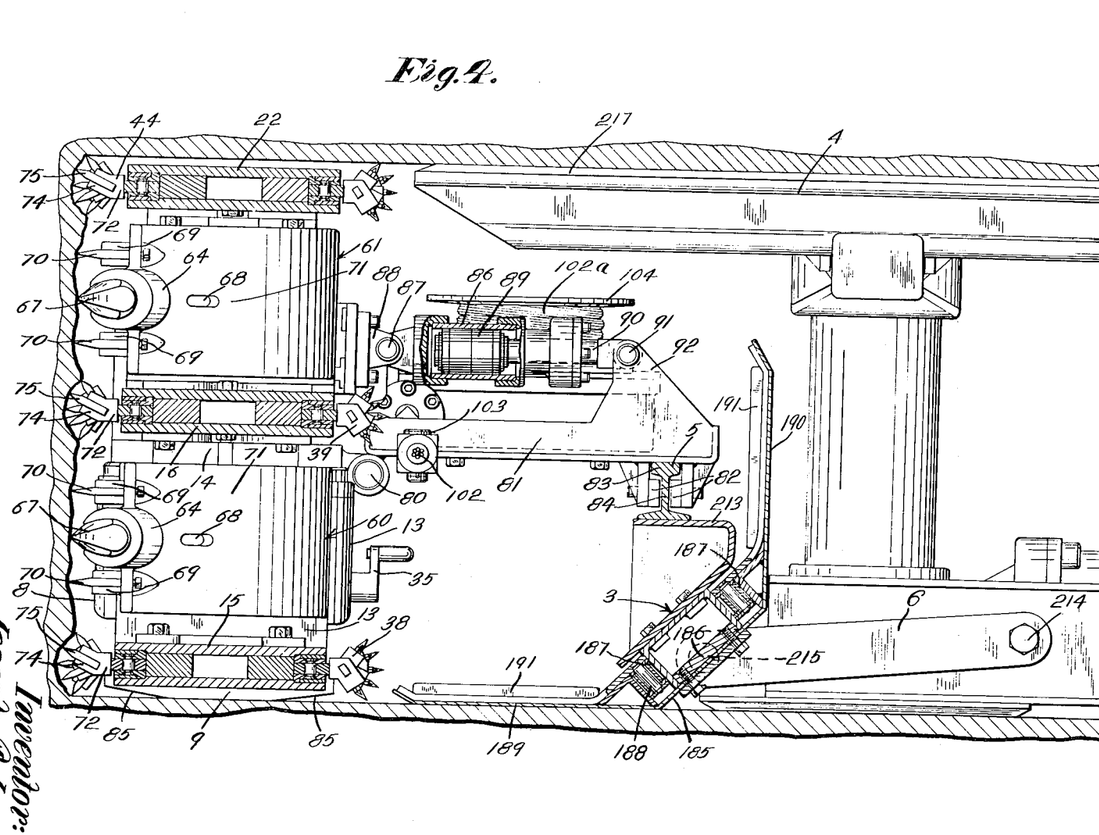
Fig. 4 is an enlarged cross sectional view taken on line 4—4 of Fig. 1, illustrating details of the cutting and dislodging device and showing the associated conveyor and walking jack.
Figure 5:
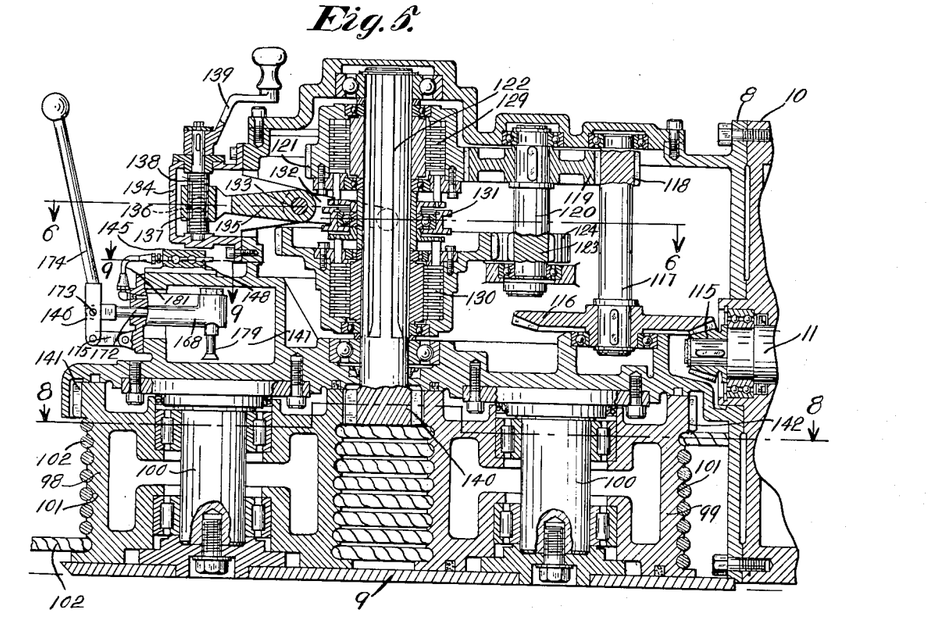
Fig. 5 is an enlarged longitudinal vertical section taken on line 5—5 of Fig. 1a, illustrating details of the cable feeding mechanism.
Figure 6:
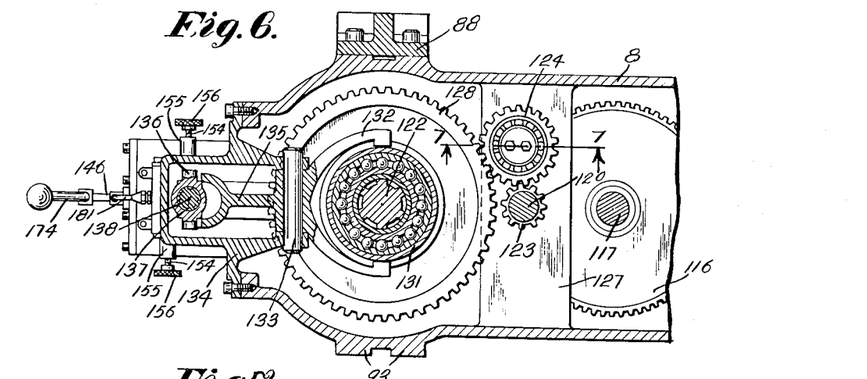
Fig. 6 is a horizontal section taken on line 6—6 of Fig. 5, showing the drum clutch and the associated drive gearing.

The reciprocatory cutting and dislodging device 1, as mentioned above, is associated with and guided for rectilinear movement by a guide rail 5 arranged parallel with the coal face and carried by the face conveyor 3, and the frame or body 8 of the device 1 is pivotally connected at 80 at longitudinally spaced points, to an elongated upper horizontal frame or support 81 located inwardly of the frame 8 in parallelism therewith (see Figs. 1a and 4). This frame 81 rests at its outer side on the tread of the guide rail 5 and has inner guides 82 loosely underlying the head 83 of the rail and extending inwardly into adjacency to the rail web 84, as shown in Fig. 4. The support 81 is adapted to slide longitudinally along the guide rail 5 as the reciprocable cutting and dislodging device 1 is moved back and forth along the coal face, with the bottom plate 9 of the frame 8 sliding over the mine floor. The frame 8 is adapted to be rocked about its longitudinal axis about the pivots 80 to vary the inclination of the cutter bars thereby to enable operation of the device over an uneven floor or so-called rolling bottom, and the bottom plate 9, as shown in Fig. 4, is oppositely inclined or beveled at 85 to facilitate such lateral rocking movement.

The tilting means for the frame 8 of the reciprocable cutting and dislodging device 1 comprises an extensible jack device including a hydraulic cylinder 86 arranged transversely of the frame and pivotally connected at 87 for vertical swinging movement to a bracket 88 secured to the adjacent side of the frame 8, and reciprocable in this cylinder is a piston 89 having its piston rod 90 pivotally connected at 91 to upstanding flanges 92 integral with the support 81. The pivots 87 and 91 extend longitudinally in parallelism, as shown. Thus, when liquid under pressure is properly supplied to the tilting cylinder 86 the frame 8 may be rocked back and forth slightly about its longitudinal axis while it remains resting on the mine floor and, as a result, the cutter bars 15, 16 and 22 may be inclined slightly in either direction with respect to the horizontal. The frame 8 has suitable lug portions 93 and 94 at its opposite outer side and the lug portions 93 correspond to the lug portions of the pivots which engage pivot pins 95 and the lug portions 94 correspond to those which engage the bracket 88 so that the cutting and dislodging device 1 may be transposed with respect to the face conveyor with its frame 8 into either of opposite reversed positions, as will hereinafter be fully explained. The tilting cylinder 86, when the frame 8 is reversed, may be located at the opposite end of the support 81 and the opposite connection 96 on the support 81 for the piston rod is shown in Fig. 1a. Thus, the reciprocatory cutting and dislodging device 1 may be reversed end for end with respect to the face conveyor to enable mining of coal in the opposite direction along the same face, if desired.

Figure 8:
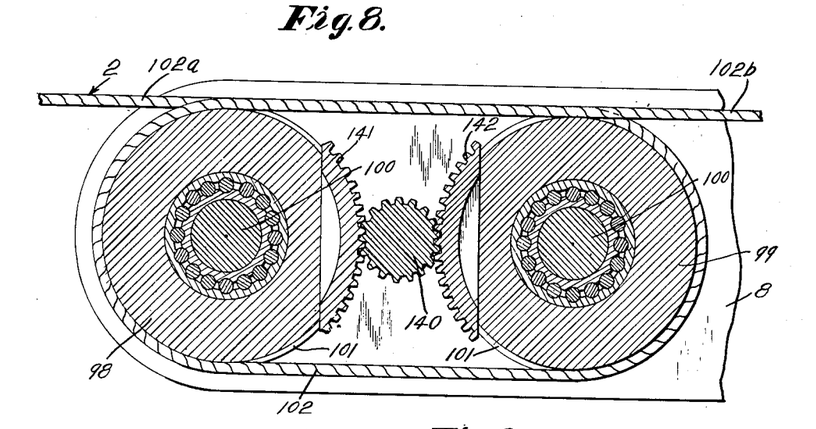
Fig. 8 is a horizontal section taken substantially in the planes of line 8—8 of Fig. 5, showing the feed drums and a portion of the drive gearing.
Figure 12:
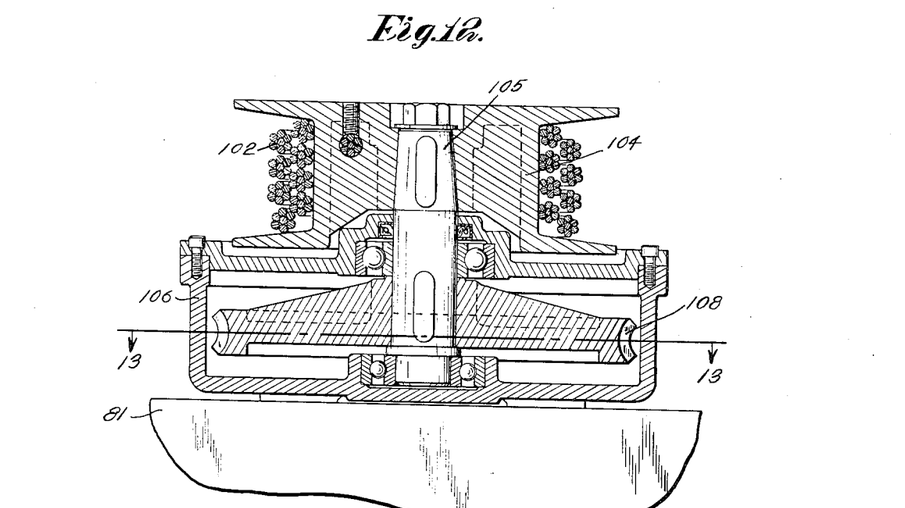
Fig. 12 is an enlarged vertical section taken on line 12—12 of Fig. 1a, showing details of the take-up drum.
Figure 13:
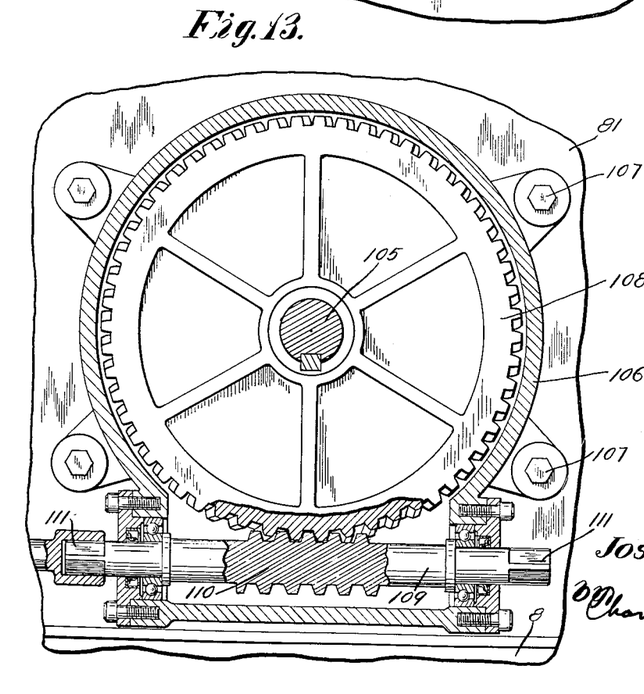
Fig. 13 is a horizontal section taken on line 13—13 of Fig. 12.

Now referring to the flexible feeding means 2 for the reciprocatory cutting and dislodging device 1, it will be noted that mounted at the rearward portion of the frame 8 is a pair of horizontal cable winding drums 98 and 99 arranged in adjacency on parallel vertical axes, as shown in Fig. 5. The frame 8 has secured thereto upright shafts 100 which suitably support bearings on which the drums are journaled, and these shafts are desirably arranged so that the drum axes lie in a central longitudinal vertical plane or median line of the frame 8 (see Figs. 1a and 8). The drums 98 and 99 are peripherally grooved at 101 and wound about the drums in these grooves, in the manner shown, is an intermediate portion of a feeding cable 102. The drums revolve in the same direction and by wrapping the cable in elongated generally oval-shaped loops about both drums, as shown in Fig. 8, a relatively large drum capacity in a relatively small lateral space is attained. The two drums cooperate to provide a winding area corresponding to that of a single drum of relatively large diameter, in substantially less than one-half of the space which would be required by a single large drum. The cable 102 has its opposite end portions 102a and 102b extending longitudinally in opposite directions from the drums (Fig. 8) and the forward and rearward portions are arranged in double reeve, as later explained, to obtain a two to one multiplication of power. The reverse strand of the forward cable connection is attached at 103 (Fig. 1) to the support 81 and the reverse strand of the rearward cable connection is wound upon a take-up drum 104 (Fig. 1a) mounted on the top of the support 81 for rotation about a vertical axis. This take-up drum, as shown in Fig. 12, is keyed to a vertical shaft 105 journaled in bearings supported by a gear housing 106 secured, as by screws 107, to the support 81. A worm wheel 108 is arranged within the housing 106 and has its hub keyed to the shaft 105. As shown in Fig. 13, a horizontal shaft 109 is journaled in bearings supported within the gear housing and has secured thereto, within the housing, a worm 110 meshing with the worm wheel. The end portions 111 of the shaft 109 are suitably shaped for engagement with a suitable turning instrument such as a conventional hand crank. By rotating the drum 104 the rearward strand of the feeding cable may be wound in, as desired, to vary the tension of the cable to prevent slippage on the drums. The teeth of the worm gears are self-locking and serve to hold the take-up drum in adjusted position.

Figure 7:
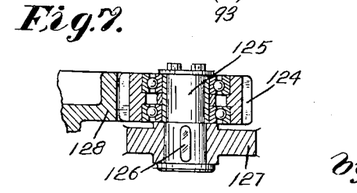
Fig. 7 is a detail vertical section taken on line 7—7 of Fig. 6.

The driving means for the feed drums 98 and 99 comprises a bevel pinion 115 keyed to the rear end of the motor shaft 11 (Fig. 5) and meshing with a bevel gear 116 in turn having its hub keyed to the lower end of a vertical shaft 117, the latter being suitably journaled in bearings supported within the frame 8. Formed at the upper end of the shaft 117 is a spur pinion 118 meshing with and driving a spur gear 119 keyed to the upper portion of a vertical shaft 120 likewise suitably journaled in bearings supported within the frame 8. The spur gear 119 meshes with and drives a spur gear 121 journaled on bearings supported by a vertical shaft 122, likewise suitably journaled in bearings supported within the frame. Also, secured to the shaft 120 near its lower end is a spur pinion 123 meshing with a spur gear 124 journaled on bearings supported by a vertical shaft 125 (Fig. 7) keyed at 126 to a lock 127 integral with the frame 8. The gear 124 meshes with and drives a large spur gear 128 arranged coaxial with the spur gear 121 and likewise journaled on bearings supported by the vertical shaft 122. The gears 121 and 128 rotate in relatively opposite directions at relatively different speeds and respectively constitute the high and low speed terminal gears of the plural speed drum-drive. The coaxial gears 121 and 128 are alternately connectible to the shaft 122 by conventional friction disc clutches 129 and 130 respectively, thereby to drive the shaft 122 at a relatively low speed in one direction and at a relatively high speed in the opposite direction. Surrounding the shaft 122 intermediate the disc clutches is an annular clutch shifter member 131 which may be moved upwardly to load the clutch 129 or may be moved downwardly to load the clutch 130, and cooperating with this shifter member is a pivoted shipper yoke 132 pivotally mounted on a cross shaft 133 supported by a detachable cover member 134 secured to the frame 8. This shipper yoke has a lever 135 pivotally engaging trunnions 136 formed on a nut 137 which is threadedly connected to a vertical screw shaft 138. This screw shaft is suitably rotatably mounted within the cover member 134 (Fig. 5) and has keyed thereto at its upper end, exteriorly of the frame 8, a conveniently located hand lever 139. By properly manipulating this hand lever the clutch shifter member 131 may be moved axially in opposite directions through the screw and nut device and shipper yoke, and the screw threads serve to hold the same in adjusted position. Secured to the lower end of the shaft 122 is a spur gear 140 meshing with spur gears 141 and 142 secured to the drums 98 and 99 respectively. Thus, by appropriately loading the disc clutches 129 and 130 the feed drums may be driven in unison to wind in the cable to effect feeding of the cutting and dislodging device 1 either forwardly at a relatively slow cutting and dislodging speed or rearwardly at a relatively high positioning or retracting speed.

Figures 9, 10, 11:
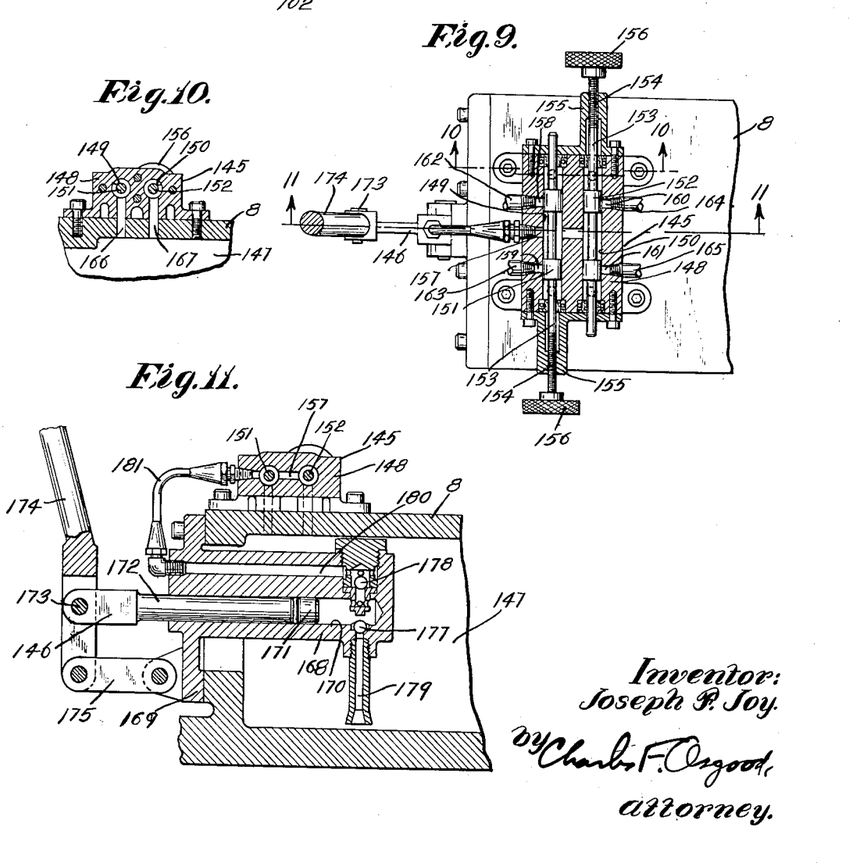
Fig. 9 is an enlarged horizontal section taken on line 9—9 of Fig. 5, illustrating the control valve device.
Fig. 10 is a detail cross section taken on line 10—10 of Fig. 9.
Fig. 11 is a vertical section taken on line 11—11 of Fig. 9, showing the hand pump.
Figure 17:
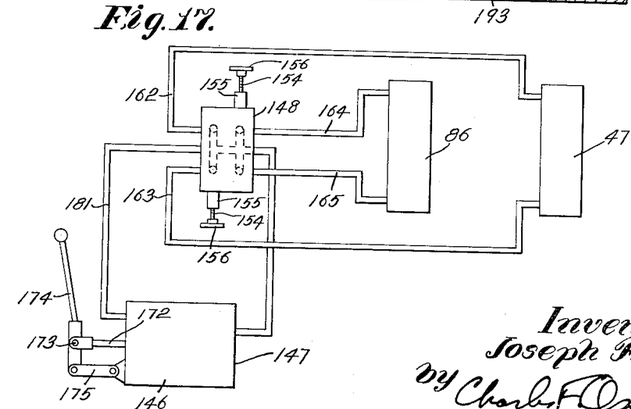
Fig. 17 is a diagrammatic view illustrating the hydraulic system.

Mounted on the frame 8 is a control valve device 145 and a conventional hand pump 146 for supplying liquid under pressure from a liquid reservoir 147 to the hydraulic elevating and tilting cylinders 47 and 86. As shown in Figs. 9 and 10, this valve device comprises a valve casing 148 suitably secured to the frame 8 and having parallel horizontal bores 149 and 150 containing spool type slide valves 151 and 152. The stems 153 of these valves have integral screws 154 threadedly engaged with nut elements 155 and provided with hand wheels 156. A central passage 157 in the valve casing communicates with the valve receiving bores midway between their ends, and communicating with the bores at opposite sides of the central passage are ports 158, 159, 160 and 161. The ports 158 and 159 are respectively connected by conduits 162 and 163 to the opposite ends of the elevating cylinder 47, and the ports 160 and 161 are respectively connected by conduits 164 and 165 to the opposite ends of the tilting cylinder 86, as shown diagrammatically in Fig. 17. Discharge passages 166 and 167 lead from the valve receiving bores back to the reservoir, as shown in Fig. 10. The hand pump 146 comprises a cylinder 168 integral with a cover plate 169 attached to the frame 8 for closing the open side of the reservoir, and this cylinder has a bore 170 containing a reciprocable piston 171. This piston has a piston rod 172 which is pivotally connected at its outer end at 173 to a hand lever 174 which is in turn pivotally connected by a floating link 175 in turn pivotally connected to the cover plate. This pump cylinder has a ball type intake valve 177 and a ball type discharge valve 178 and these valves control liquid flow respectively through an inlet passage 179 communicating with the reservoir below the liquid level, and with a passage 180 connected by a conduit 181 to the central supply passage 157 on the valve casing. Thus, as the pump piston is reciprocated within the cylinder bore liquid is drawn from the reservoir into the bore 170 and is discharged under pressure from the bore to the passage 157. The slide valves 151 and 152 may be manually adjusted to effect liquid flow to the desired ends of the cylinders 47 and 86 in an obvious manner. Also, liquid may be trapped in the cylinders by proper positioning of the valves, or liquid may be discharged from the cylinders through the passages 166 and 167 back to the reservoir.

Figure 16:
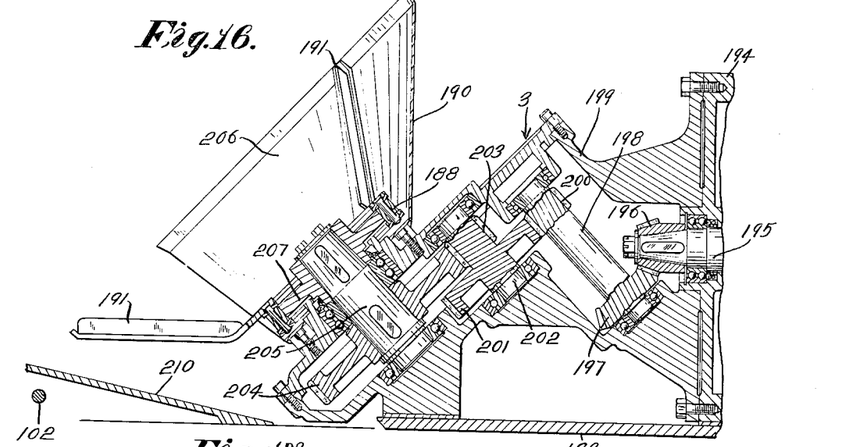
Fig. 16 is an enlarged vertical section taken on line 16—16 of Fig. 14a, illustrating details of the conveyor drive.

The face conveyor 3 comprises a frame 185 which rests on the floor of the mine as shown in Fig. 4 and this frame has an inclined central portion 186 providing guideways 187 for an endless drive chain 188 of the conveyor. Extending horizontally from the central frame portion 186 is a bottom frame portion 189 while extending vertically at right angles to the bottom frame portion is an opposite frame portion 190. Attached at spaced intervals to the endless drive chain 188 are lateral conveyor flights 191, which move horizontally along the bottom frame portion 189 of the conveyor frame to move the loose coal dislodged from the coal face longitudinally away from the face, and the conveyor flights of the return run of the conveyor chain move into upright inactive positions along the inner side of the upright frame portion 190. Mounted in a suitable manner on the frame of the adjacent one of the walking jacks 4 is a lateral supporting plate 193 (Fig. 14a) which carries a motor 194, herein desirably an electric motor, having a horizontal power shaft 195 (Fig. 16) arranged at right angles to the longitudinal median line of the conveyor. Keyed to this shaft is a bevel pinion 196 meshing with a bevel gear 197 secured to an upwardly and outwardly inclined shaft 198 suitably journaled in bearings supported within a gear housing 199 carried by the bottom plate 193. Secured to this inclined shaft is a spur pinion 200 meshing with and driving a spur gear 201 secured to a parallel inclined shaft 202 likewise suitably journaled in bearings supported within the gear housing. Secured to the shaft 202 is a spur pinion 203 meshing with a spur gear 204 keyed to a third inclined paralled shaft 205 also suitably journaled within bearings supported within the gear housing. The frame of the conveyor, at the discharge end of the latter, is elevated, as shown in Figs. 14a and 16, with the vertical frame portion curved and flared outwardly at 206, and the conveyor chain leaves its guideways on the central frame portion 186 and extends upwardly around a drive sprocket 207 keyed to the upper end of the driven shaft 205. The bottom horizontal portion of the conveyor frame, at the opposite end of the conveyor, is curved and flares upwardly and outwardly as shown at 208 in Fig. 14, and the vertical inactive conveyor flights of the return run of the conveyor chain move from their upright position, shown in Fig. 4, downwardly along the flared plate 208 into their horizontal active position above the bottom frame portion 189 of the conveyor frame. A conventional flared loading pan 210 of a shaker conveyor 211 extends in a suitable manner near the floor level beneath the elevated discharge end of the face conveyor, as shown in Fig. 14a, so that the loose coal discharged from the conveyor is received by the loading pan of the shaker conveyor. The loading pan may be inclined slightly with respect to the floor and the strands of the feed cable may extend beneath the loading pan, as illustrated.

Figure 14:
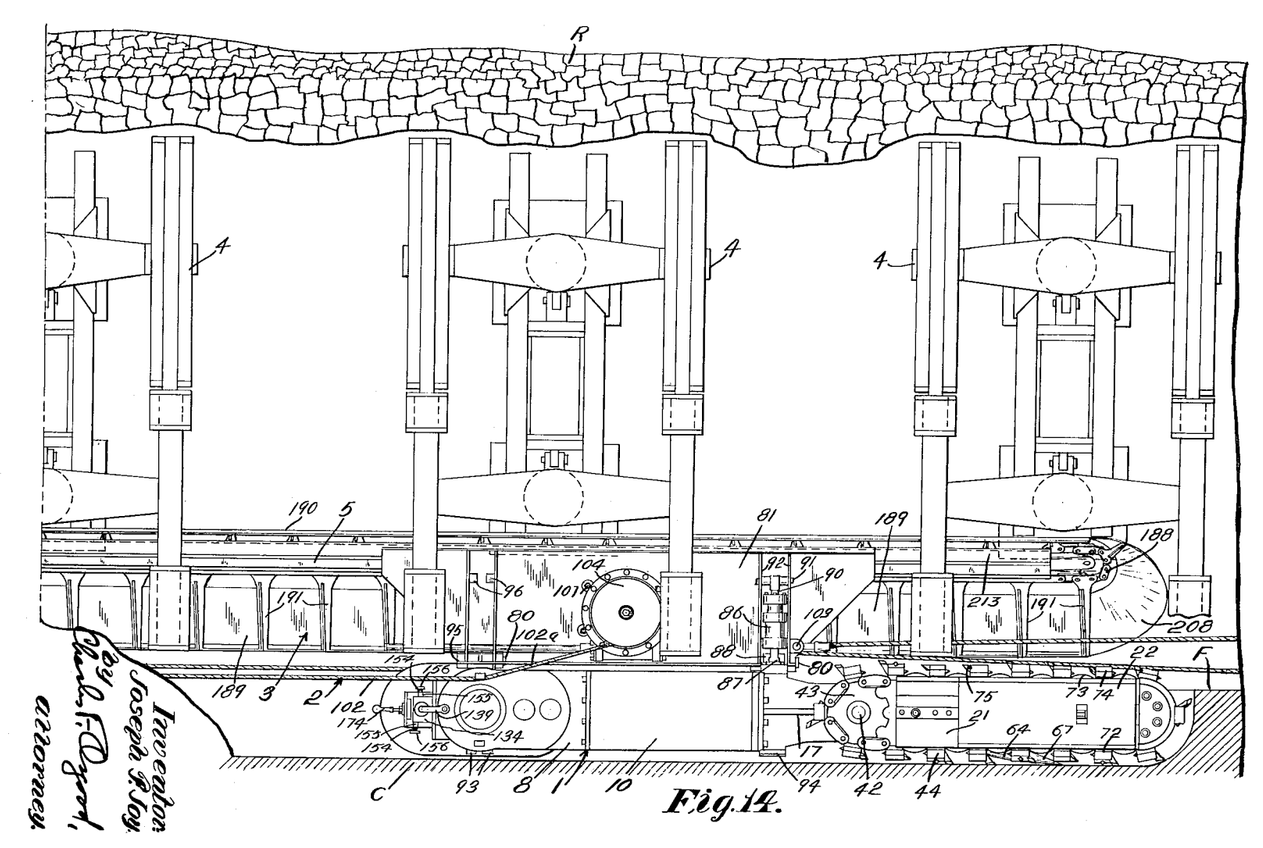
Figs. 14 and 14a, taken together, constitute a plan view, with parts omitted, showing the mining apparatus in a mine, with the cutting and dislodging device operating in conjunction with a face conveyor and walking jacks.
Figure 14A:
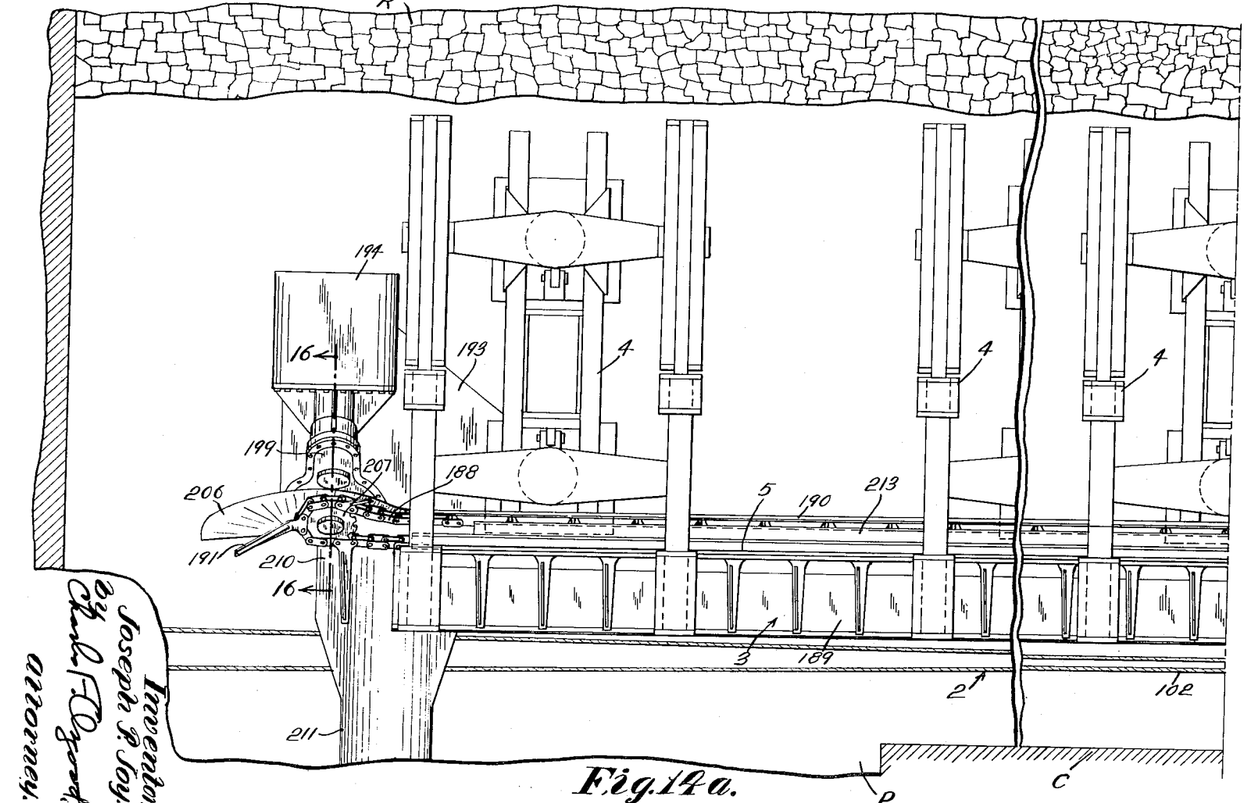

As above mentioned, the reciprocable cutting and loading device 1 may be reversed end for end with respect to the face conveyor so that the mining of coal may occur along the same coal face in the reverse direction, and to permit this the elevated discharge and receiving ends of the face conveyor are detachable from the main body of the conveyor and when detached reversed ends may be substituted therefor, with the discharge end then located at the right in Fig. 14 and the opposite end at the left. The lug connections 93 and 94 above described enable attachment of the cutting and loading device in its reversed position to the support 81. The central portion of the conveyor frame 186 carries a member 213, as shown in Fig. 4, by which the guide rail 5 is supported. The face conveyor does not per se enter into the present invention and is fully disclosed in my copending application, Serial No. 217,333 filed March 24, 1951, now matured into Patent No. 2,630,207, granted March 3, 1953.

As described above, the face conveyor is attached to every other one of the walking jacks by the pivoted links 6, and, as shown in Fig. 4, these links are pivotally mounted at 214 to the base frame of the walking jacks to swing in vertical planes perpendicular to the coal face and are pivotally connected at 215 on parallel axes, to the conveyor frame 185. Thus, when the frames of the walking jacks are advanced, in the manner described in the application above referred to, the face conveyor, together with the cutting and dislodging device, is advanced toward the coal face, and the pivoted links 6 permit free relative up and down movement of the conveyor and jacks as they move over an uneven mine floor, and the links float up and down as necessary during such movement to prevent binding of the parts. As the cutting and dislodging device is advanced toward the coal face with the face conveyor over the mine floor the upper support 81 may rock slightly about its connection with the guide rail 5 while the bottom plate of the frame 8 may slide freely over the mine floor.

The walking jacks 5 support upper roof engaging plates 217 which are of substantial area and which overlie the space above the face conveyor between the walking jacks and the cutting and dislodging device 1 so that a relatively protected passageway is provided lengthwise of the apparatus to enable the workmen to travel along the bottom of the face conveyor when the latter is inactive thereby to reduce the possibility of injury to the workmen due to roof falls or cave-ins.

Figure 18:
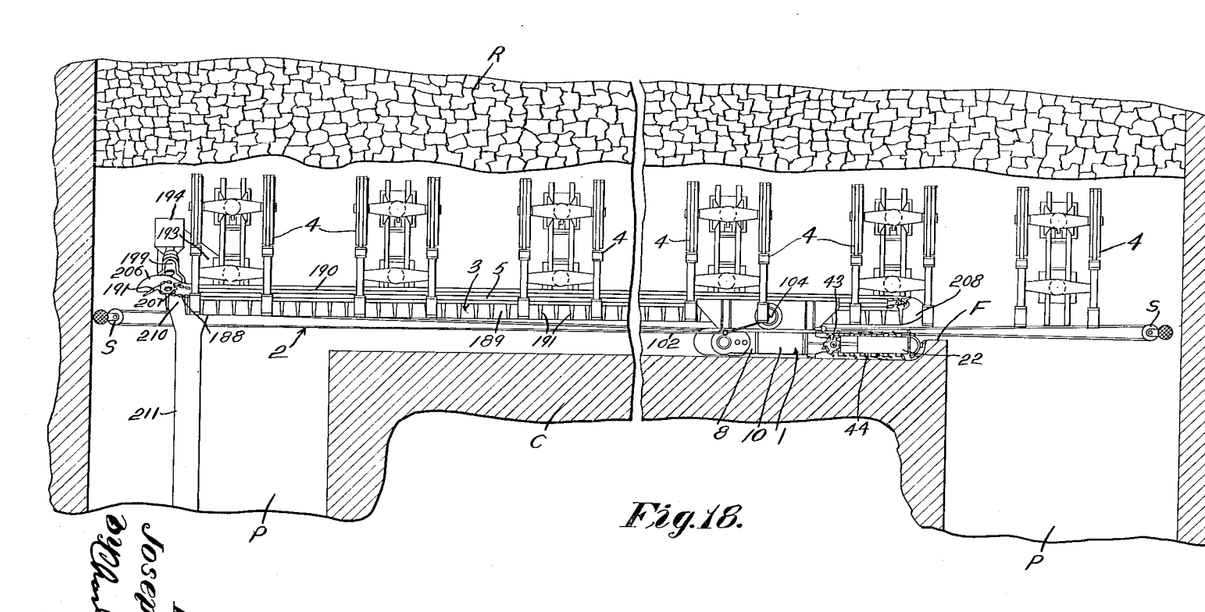
Fig. 18 is a diagrammatic view showing the mining apparatus in an operating position in a mine with the coal cutting and dislodging device operating along the face of a coal pillar in conjunction with the face conveyor and walking jacks.

The general mode of operation of the improved mining apparatus will now be briefly described. As shown diagrammatically in Fig. 18, the coal pillar C has a face F which extends longitudinally between parallel mine passageways or so-called roadways P. The mine roof above the roadways is suitably supported in any conventional manner as by roof props or cribbing, not shown. The face conveyor 3 extends longitudinally in parallelism with the coal face between the roadways and at its discharge end extends into the left-hand roadway into a position to discharge onto the shaker conveyor 211 which extends longitudinally within the left-hand roadway. The walking jacks 4 are located outwardly from the face beyond the face conveyor as shown, and serve to support and control the roof, and, as mining progresses, the roof jacks are advanced and the roof is allowed to subside, and the broken roof rock is designated R. The face conveyor 3 is suitably held in position by the walking jacks and the oppositely extending flexible portions of the feeding cable are extended longitudinally in parallelism with the coal face and pass around guide sheaves or pulleys S suitably anchored at the outer walls of the roadways. The feed drums 98 and 99 may be operated at a relatively high speed to move the reciprocatory cutting and dislodging device 1 rapidly back along the face into the left-hand roadway, and the cutting and dislodging device and the face conveyor may then be advanced by the walking jacks to bring the superimposed cutter bars 15, 16 and 22 into their proper starting position at the left-hand end of the coal face. The feed drums may then be driven in the opposite direction at a relatively slow speed to effect forward movement of the cutting and dislodging device 1 at a cutting and dislodging speed across the coal face, and parallel superimposed slots or kerfs are cut in the solid coal by the cutter chains and the projections of coal between the slots are dislodged by the splitting tools 60 and 61, the dislodged coal is deflected laterally onto the face conveyor and is conveyed from the coal face to the left-hand roadway where it is discharged onto the shaker conveyor. The cutting and dislodging device 1 is shown in Fig. 18 near its completion of a transverse working stroke near the right-hand end of the face. Thus, the cutting and dislodging device is moved back and forth across the coal face, and is advanced toward the face as mining progresses between its transverse working strokes by the walking jacks. As the apparatus is advanced along the coal pillar as mining proceeds, the guide sheaves or pulleys S are appropriately shifted forwardly along the outer walls of the roadways.

As a result of this invention an improved coal mining apparatus is provided especially designed for use in coal seams of low height for rapidly and efficiently mining and loading out the coal. By associating the reciprocatory cutting and dislodging device with the face conveyor and the walking jacks flexibility in operation is obtained as well as extreme compactness which is highly desirable in mines having low headroom. By the provision of the novel arrangement of the superimposed cutter bars and their associated splitting tools the coal may be rapidly dislodged in relatively large fragments from a solid coal seam. The mining apparatus is not only efficient and rapid in operation, and relatively compact, but is also comparatively simple and rugged in design well adapted to meet the severe conditions encountered in the mining of coal. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a mining apparatus, the combination comprising a cutting and dislodging device movable bodily along the face of a mine vein for mining mineral from a solid mine vein and comprising superimposed kerf cutters for cutting parallel kerfs in the mineral to form a projection of mineral between the kerfs, a splitting tool movable bodily in unison with said kerf cutters and having a pointed splitting instrument extending forwardly and inwardly with its splitting point lying in a vertical plane close to the inner sides of said kerf cutters for splitting the projection of mineral from the face, and a deflector disposed vertically between said kerf cutters and extending longitudinally to the rear of said tool and laterally toward the sides of said cutters remote from the vein-face, said deflector extending forwardly and inwardly toward said splitting instrument for deflecting the dislodged mineral laterally between said cutters away from the vein-face.

2. A mining apparatus of the character set forth in claim 1 wherein mounting means is provided for said kerf cutters and includes an adjustable support for the upper kerf cutter for varying the elevation of the latter to vary the distance apart of said kerf cutters thereby to vary the width of the mineral-projection formed by said cutters, and means for adjusting said support vertically, said tool effecting splitting of the mineral-projection and said deflector deflecting the dislodged mineral laterally irrespective of the relatively adjusted positions of said cutters.

3. In a mining apparatus, the combination comprising a cutting and dislodging device, said device including a plurality of superimposed parallel kerf cutters for cutting parallel kerfs in the face of a mine vein to form projections of mineral between the kerfs, mineral splitting tools movable bodily in unison with said kerf cutters and arranged vertically in the spaces between said cutters for dislodging said mineral projections from the face, and deflectors disposed vertically between said kerf cutters and extending longitudinally to the rear of said tools and laterally toward the sides of said cutters remote from the face of the mine vein, said deflectors serving to deflect the dislodged mineral rearwardly and outwardly from the face of the mine vein as the device is advanced along the face.

4. A mining apparatus of the character set forth in claim 3 wherein said superimposed parallel kerf cutters include relatively narrow, elongated plane cutter bars extending longitudinally, endwise, parallel to the face of the mine vein, and endless cutter chains guided for orbital circulation about the margin of said bars.

5. A mining apparatus of the character set forth in claim 3 wherein means for supporting said kerf cutters and said tools is provided and include an adjustable support for the top kerf cutter for varying the elevation of said top cutter whereby the mineral may be mined from mine veins of different heights.

6. In a mining apparatus, the combination comprising a reciprocatory cutting and dislodging device movable bodily back and forth along a rectilinear path in parallelism with a face of a mine vein, said device including cutting and dislodging means for cutting the solid mineral and for dislodging the cut mineral from the solid as said device is advanced along the face, a face conveyor arranged parallel to the vein-face, said device supported on the mine floor and movable in the space between the vein-face and said conveyor, a longitudinal guiding means extending in parallelism with said conveyor, said cutting and dislodging device having a bottom floor engaging support and a guide frame loosely engaging and movable along said guiding means for guiding said device during its reciprocatory movements relative to said conveyor, means for advancing said conveyor, said guiding means and said cutting and dislodging device in unison toward the vein-face as mining progresses, and connections between said advancing means and said conveyor providing for relative movement therebetween in vertical planes as said conveyor is advanced toward the face to compensate for unevenness of the floor, said loose engagement between said cutting and dislodging device and said guiding means providing for similar relative movement therebetween as said device moves over an uneven floor and along said guiding means.

7. In a mining apparatus, the combination comprising a series of walking jacks for supporting and controlling the roof of an underground mine, said jacks each having an element for imparting a rectilinear forward thrust, a face conveyor arranged parallel to the face of a mine vein and having a frame, pusher links each pivotally connected at one end to a thrust imparting element and at the other end to said conveyor frame for connecting said conveyor to said thrust imparting elements of said jacks at points spaced along the length of said conveyor, said links being freely swingable to provide for relative movement in a vertical direction between said conveyor and said jacks during movement thereof over an uneven mine floor, and means for operating said jacks to cause said thrust imparting elements thereof to move said conveyor through said links in a direction transverse to the length of said conveyor to advance the latter toward the face of the mine vein.

8. A mining apparatus of the character set forth in claim 7 wherein a reciprocatory cutting and dislodging device is movable over the mine floor along a rectilinear path parallel to the face of the mine vein in the space between the face and said face conveyor for cutting and dislodging the solid mineral and for deflecting the dislodged mineral laterally onto said conveyor, and means is connected to said reciprocatory device and cooperates with said face conveyor to guide said device during its reciprocatory movements, said jacks advancing said device with said conveyor toward the face of the mine vein, said cutting and dislodging device having a loose connection with said guiding means to provide for relative movement in a vertical direction therebetween during movement of said device over an uneven floor.

9. In a mining apparatus, the combination comprising a reciprocatory mineral cutting and dislodging means for cutting parallel kerfs in the mineral of a solid mine vein and for dislodging the mineral between the kerfs as cutting progresses, means providing a longitudinal guideway extending in parallelism with the face of a mine vein a substantial distance above the mine floor, said guideway arranged at the side of said cutting and dislodging means remote from the vein-face, means for reciprocating said cutting and dislodging means along said guideway providing means, said cutting and dislodging means including a guide frame and a cutting and dislodging device including parallel kerf cutters, means for pivotally mounting said cutting and dislodging device on said guide frame to rock as a unit about an axis parallel with said guideway providing means to tilt said cutters in unison, and means for rocking said cutting and dislodging device about its pivot.

10. In a mining apparatus, the combination comprising a reciprocatory mineral cutting and dislodging means, means providing a longitudinal guideway extending in parallelism with the face of a mine vein, means for reciprocating said cutting and dislodging means bodily back and forth along said guideway providing means, said cutting and dislodging means including a guide frame and a cutting and dislodging device including parallel kerf cutters for cutting parallel kerfs in the mineral of a solid mine vein and for dislodging the mineral between the kerfs as cutting progresses, means for adjusting the effective operating height of said cutting and dislodging device to vary the distance apart of the kerfs cut thereby whereby mine veins of different heights may be operated on by said device, means for pivotally mounting said cutting and dislodging device on said guide frame to rock as a unit about an axis parallel with said guiding means to tilt said cutters in unison irrespective of the adjusted height of said cutting and dislodging device, and means for rocking said cutting and dislodging device about its pivot.

11. A mining apparatus of the character set forth in claim 10 wherein said adjusting means for said cutting and dislodging device includes a fluid operated adjusting cylinder for varying the distance apart of the kerf cutters and said rocking means includes a fluid operated tilting cylinder connected between said device and said guide frame, a pump mounted to move bodily back and forth with said cutting and dislodging device, and manually operable valve means for controlling flow of fluid under pressure from said pump to said cylinders respectively, said valve means positionable to trap fluid in said cylinders to lock said parts in adjusted positions.

12. In a mining apparatus, the combination comprising a unitary mineral cutting and dislodging device including a plurality of parallel, superimposed cutter bars each carrying an endless cutter chain and disposed with their major axes extending longitudinally of the apparatus, means for mounting said cutter bars for movement longitudinally, endwise, along a path parallel with the face of a mine vein to effect cutting of parallel horizontal kerfs in the mineral to form a projection of mineral between the kerfs, means carried by said mounting means for effecting relative adjustment of said bars to vary their distance apart to vary the operating height of said device, and dislodging tools arranged on said mounting means intermediate said cutter bars for dislodging said mineral-projection irrespective of the relative distance apart of said cutter bars.

13. In a mining apparatus of the character set forth in claim 12 wherein said mounting means for said cutting and dislodging device includes a pivot whereby said device may tilt as a unit about a longitudinal axis parallel with the face of the mine vein, and means is carried by said mounting means for tilting said cutting and dislodging device about said axis irrespective of the adjusted height of said cutting and dislodging device.

14. In a mining apparatus, the combination comprising a series of walking jacks for supporting and controlling the roof of an underground mine and each having a base resting on the mine floor and movable step by step over the mine floor and means for imparting a rectilinear thrust to said base for moving the latter step by step as aforesaid, a face conveyor including a frame having its bottom resting on the mine floor and arranged parallel with the face of a mine vein, and pusher means connected to said jack bases and to said conveyor frame to move in vertical planes relative thereto for connecting said conveyor at spaced points along its length to said bases of said series of jacks for permitting free relative up and down movement between said jacks and said conveyor as the same are moved over an uneven floor, said jacks as thrust is imparted to the bases thereof advancing said conveyor over the floor toward the face of the mine vein.

15. In a mining apparatus, the combination comprising a reciprocatory mineral mining and dislodging device movable over the mine floor along a path parallel to a face of a mine vein, a face conveyor arranged parallel to the vein-face, means for guiding said mining and dislodging device for reciprocatory movements in a direction in parallelism with said conveyor during the mining operation, said device having a guide frame loosely engaging said guiding means, a series of walking jacks operatively connected to said conveyor at spaced points along the length of the latter for advancing said conveyor and said mining and dislodging device in unison toward the vein-face as mining progresses, and connections between said jacks and said conveyor providing for relative movement in vertical planes therebetween as said conveyor is advanced toward the face to compensate for unevenness of the floor, said loose engagement between said mining and dislodging device and said guiding means providing a similar relative movement therebetween as said device moves over the floor and along said guiding means.

16. In a mining apparatus of the character set forth in claim 15 wherein said connecting means between said jacks and said conveyor include pivoted links freely pivotally connected to said bases of said jacks and to said conveyor at spaced points along the length of the latter to swing in vertical planes perpendicular to the face of the mine vein, said links inclined forwardly and downwardly with respect to their pivotal connections with said jack-bases whereby the latter as they are thrust rectilinearly as aforesaid may impart a forward advancing thrust to said conveyor near the bottom of the latter.

17. In a mining apparatus, the combination comprising a face conveyor extending longitudinally in parallelism with the face of a mine vein, said conveyor including a frame providing a guideway and an endless conveyor chain guided for orbital circulation along said guideway, said frame having an upstanding supporting means connected thereto within the orbital path of said chain, a longitudinally extending horizontal guide rail arranged parallel to the vein-face and carried by said upstanding supporting means, a reciprocatory cutting and dislodging device guided by said guide rail for reciprocatory movements back and forth across the vein-face, and means operatively connected to said conveyor for advancing the latter and said cutting and dislodging device toward the vein-face as mining progresses.

18. A mining apparatus of the character set forth in claim 17 wherein said reciprocatory cutting and dislodging device includes a cutter supporting frame resting upon and sliding over the floor of the mine just outside of the face of the mine vein.

19. A mining apparatus of the character set forth in claim 17 wherein said reciprocatory cutting and dislodging device includes a guide frame having loose guided engagement with said guide rail and a cutter supporting frame resting upon and sliding over the mine floor, and a pivotal connection between said guide frame and said cutter supporting frame to provide for rocking movement of said latter frame about an axis parallel with said guide rail.

20. In a mining apparatus of the character set forth in claim 19 wherein a power operated adjusting device is connected between said guide frame and said cutter supporting frame for rocking the latter about its pivotal axis relative to said guide frame to tilt said cutting and dislodging device to enable the latter to follow an uneven mine floor during its reciprocatory movements.

21. In a mining apparatus, the combination comprising a reciprocatory mineral cutting and dislodging means, means providing a longitudinal guideway extending in parallelism with the face of a mine vein a substantial distance above the mine floor, said guideway arranged at the side of said cutting and dislodging means remote from the mineral-vein, means for mounting said cutting and dislodging means on said guideway for reciprocatory movement therealong and for tilting movement relative to said guideway about a pivotal axis parallel with said guiding means, means for reciprocating said cutting and dislodging means along said guiding means, and means for rocking said cutting and dislodging means about its pivotal axis in vertical planes perpendicular to said guideway.

22. In a mining apparatus, the combination comprising spaced apart parallel cutter bars having endless cutter chains guided for orbital circulation about their margins, means for mounting said cutter bars for movement in unison endwise along the face of a mine vein in a direction in parallelism with the face, said cutter chains as said bars are advanced along the face cutting parallel spaced apart kerfs in the mineral of the mine vein to form a projection of mineral between the kerfs, means cooperating with said cutter bars and carried by said mounting means for dislodging the projection of mineral from the face comprising a splitting tool arranged between said cutter bars and having a forwardly and inwardly projecting splitting portion with its point located near the inner orbital path of said cutter chains, and a deflector arranged perpendicular to the planes of said bars and extending rearwardly and outwardly from said splitting tool intermediate said cutter bars for deflecting the dislodged mineral outwardly from between said cutter bars.

23. A mining apparatus as set forth in claim 22 wherein a face conveyor is arranged in parallelism with the face of the mine vein and guiding means is supported by said face conveyor and on which said mounting means is guided for movement back and forth along the veinface, said deflector deflecting the dislodged mineral outwardly towards said face conveyor.

24. In combination, spaced apart parallel kerf cutters for cutting parallel kerfs in the mineral of a solid mine vein to form a projection of mineral between the kerfs, means for moving said cutters in unison relative to the face of the mine vein, a pointed ripping tool arranged between said cutters with its point located at the inner sides of said cutters for engaging the projection of mineral near its point of attachment with the solid vein for dislodging the projection, and a deflector arranged perpendicular to the planes of said cutters and extending rearwardly and outwardly from said pointed tool for deflecting the dislodged mineral outwardly from between said cutters.

25. A combination as set forth in claim 24 wherein means is provided for relatively adjusting said kerf cutters to vary their distance apart while their parallel relation is maintained thereby to vary the thickness of the mineral-projection, said pointed ripping tool acting to dislodge the mineral-projection irrespective of the relatively adjusted positions of said cutters.

26. In a mining apparatus, a mineral mining device including a frame movable along a path parallel with the face of a mine vein, superimposed kerf cutters for cutting parallel slots in the mineral, and a pointed coal splitting tool projecting forwardly and outwardly for engaging the mineral inwardly of the face of the mine vein, said frame having a rearwardly and inwardly inclined vertical surface between said cutters for deflecting the dislodged mineral laterally from the face of the mine vein as said frame is advanced.

27. In a mining apparatus, the combination comprising a support movable along the face of a mine vein, a pair of spaced apart parallel cutter bars carried by said support and having endless cutter chains guided for orbital circulation about their margins for cutting parallel slots in the mineral of the vein to provide a projection of mineral between said slots, splitting means arranged in the space between said cutter bars and spaced rearwardly of the forward ends of the latter, said splitting means extending forwardly and outwardly toward the outer portions of the orbits of said chains for breaking off fragments of said projection of mineral as said support is moved along the face, and deflector means associated with said splitting means and extending between said cutter bars from adjacency to said splitting means rearwardly and inwardly for deflecting the dislodged mineral outwardly and rearwardly from the face and for discharging the mineral laterally of the inner portions of said chain orbits.

28. A mining apparatus as set forth in claim 27 wherein three parallel cutter bars are provided and said splitting means and said associated deflector means are arranged in the spaces between said three cutter bars.

29. A mining apparatus as set forth in claim 28 wherein one of said cutter bars is adjustable relative to the adjacent bar to vary their distance apart.

30. A mining apparatus as set forth in claim 29 wherein a power device is connected between a pair of cutter bars within the chain orbits for relatively adjusting said bars.

31. A mining apparatus as set forth in claim 27 wherein said parallel cutter bars are narrow and elongated and are arranged with their major axes extending longitudinally of said support in substantial parallelism with the vein-face.

32. A mining apparatus as set forth in claim 27 wherein means is provided for mounting said cutter bars on said support to tilt about a longitudinal axis, together with means for tilting said bars about said axis.

33. In a mining apparatus, the combination comprising a guide frame extending longitudinally in parallelism with the face of a mine vein, a reciprocatory cutting and dislodging device having a bottom shoe slidable on its bottom over the mine floor, a second frame in guided engagement with said guide frame and operatively connected to said device for guiding the latter during its reciprocation, and means for operatively connecting said second frame to said device including a pivotal mounting between said second frame and said cutting and dislodging device providing for tilting movement of said device about its points of supported contact with the floor and adjusting means for tilting said device about such points of supported contact with the floor.

34. The combination as set forth in claim 33 wherein a loose connection is provided between said second frame and said guide frame wherein said second frame may tilt in vertical planes relative to said guide frame as said shoe of said cutting and dislodging device moves along a floor which is rolling or uneven.

35. The combination as set forth in claim 33 wherein mounting means is provided for said guide frame, and means is provided for advancing said mounting means over the floor thereby to feed said cutting and dislodging device toward the face of the mine vein.

36. The combination as set forth in claim 35 wherein a connection adjustable freely in vertical planes is provided between said second frame and said guide frame to provide for movement of said cutting and dislodging device relative to said guide frame as said device moves over a rolling or uneven floor during advance of said second frame along said guide frame as aforesaid.

References Cited in the file of this patent

UNITED STATES PATENTS

| Number | Name | Date |
|---|---|---|
| Re. 17,109 | Miller | Oct. 23, 1928 |
| 775,900 | Frey | Nov. 22, 1904 |
| 1,201,537 | Wissemann | Oct. 17, 1916 |
| 1,303,303 | Hamilton | May 13, 1919 |
| 1,336,039 | McCarter | Apr. 6, 1920 |
| 1,450,329 | Morgan | Apr. 3, 1923 |
| 1,483,549 | Morgan | Feb. 12, 1924 |
| 1,533,316 | Holmes | Apr. 14, 1925 |
| 1,735,583 | Morgan | Nov. 12, 1929 |
| 1,737,327 | O'Toole | Nov. 26, 1929 |
| 1,741,714 | Hughes | Dec. 31, 1929 |
| 2,286,119 | Sloane | June 9, 1942 |
| 2,291,633 | Joy | Aug. 4, 1942 |
| 2,389,920 | Mavor | Nov. 27, 1945 |
| 2,399,073 | Tibbals | Apr. 23, 1946 |
| 2,420,755 | Mavor | May 20, 1947 |
| 2,539,962 | Mavor | Jan. 30, 1951 |
| 2,630,207 | Joy | Mar. 3, 1953 |

FOREIGN PATENTS

| Number | Country | Date |
|---|---|---|
| 906,272 | France | May 14, 1945 |
| 956,610 | France | Aug. 15, 1949 |
| 967,868 | France | Apr. 5, 1950 |
| 592,754 | Germany | Feb. 14, 1934 |
| 623,522 | Great Britain | May 18, 1949 |